Patented Nov. 1, 1927.

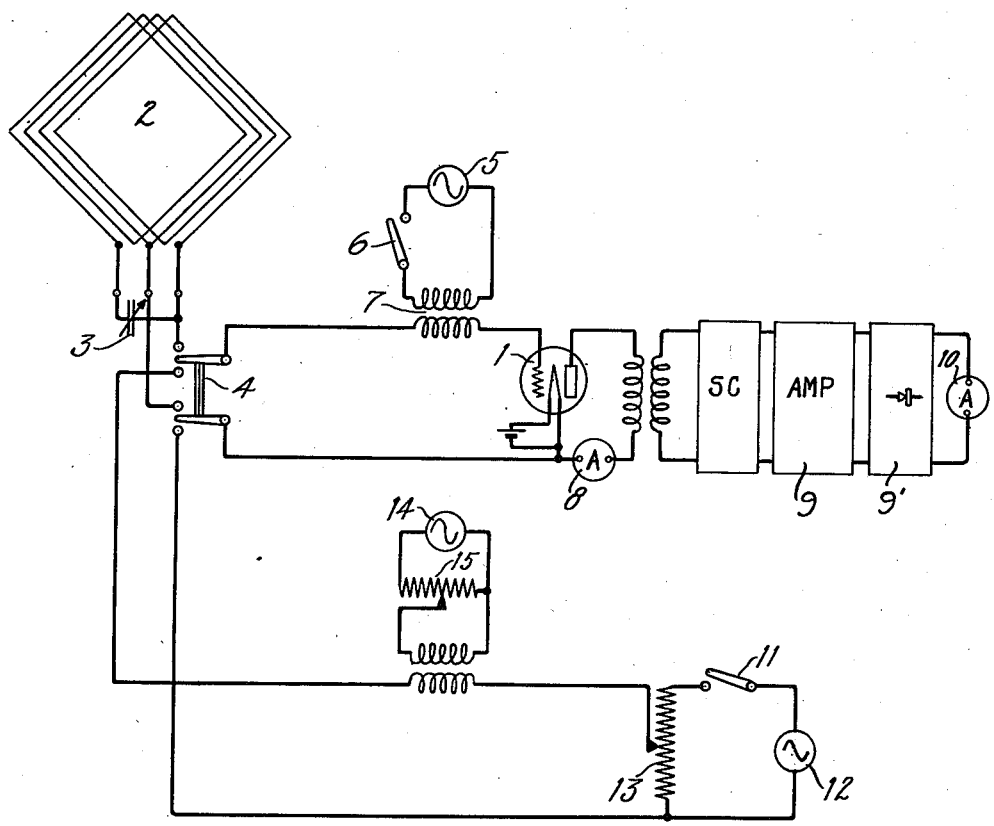

1,647,349

UNITED STATES PATENT OFFICE.

HARALD T. FRIIS, OF RED BANK, NEW JERSEY, ASSIGNOR TO WESTERN ELECTRIC COMPANY, INCORPORATED, OF NEW YORK, N. Y., A CORPORATION OF NEW YORK.

RADIO SIGNALING APPARATUS.

Application filed June 9, 1925. Serial No. 35,866.

This invention relates to signaling systems and more particularly to a system for measuring the intensity of a wave of unknown intensity. One embodiment of the invention comprises a field strength measuring set.

In field strength measuring sets difficulty is experienced at extremely high frequencies, such as are used in short-wave work, in supplying local oscillations of a given amplitude for purposes of comparison. The calibration of a local oscillator to be operated at high frequencies is uncertain and varies due to local conditions to such an extent that readings taken on the basis of previous calibrations are inaccurate.

It is an object of this invention to provide improvements in systems for measuring the amplitude of waves of extremely high frequency.

Another object is to provide a system of the above described character which is capable of operating with increased accuracy to measure the intensity of received waves of extremely high frequencies.

These objects and others which will be apparent as the nature of the invention is disclosed are accomplished by comparing the signal received in a double detection receiver with a local signal of the same intermediate frequency obtained by beating waves from local sources operating at comparatively low frequency but having a beat frequency corresponding to the intermediate frequency of the received signal.

A feature of the invention is a field strength measuring set comprising a double detection receiver and sources of local oscillations for comparison therewith having a beat frequency equal to the intermediate frequency to which the receiver is tuned.

Although the novel features which are believed to be characteristic of this invention will be pointed out with particularity in the claims appended hereto, the invention itself, its object and advantages, the manner of its organization and the mode of its operation will be better understood by referring to the following description taken in connection with the accompanying drawing forming a part thereof in which the figure is a diagrammatic representation of a radio receiving system embodying this invention.

In the figure the space discharge device 1 is the first detector of a double detection receiver to which signals are applied from the antenna circuit comprising loop 2 tuned by variable condenser 3. Locally produced waves from beating oscillator 5 which may be controlled by switch 6 are impressed upon the input circuit of space discharge device 1 through transformer 7 shown connected in the grid lead. Waves of intermediate frequency produced by beating the received waves with oscillations from local source 5 are impressed upon an intermediate frequency amplifier 9, selective circuit SC, and rectifier 9', in which they are amplified and rectified. The rectified waves are impressed upon a suitable indicator 10 for example a low current ammeter, by means of which their amplitude may be determined. Indicator 8 in the plate circuit of the first detector 1 serves to indicate the amplitude of the high frequency waves from source 5. These waves will not pass through the selective circuit SC associated with intermediate frequency amplifier.

Locally produced waves of controllable amplitude for purposes of comparison, derived from source 12 operating into potentiometer 13, by means of which their intensity may be varied at will, and waves from source 14 operating into potentiometer 15, are impressed upon the input circuit of tube 1 through switch 4 adapted to connect the receiving set with either the antenna circuit or the circuit including the local sources of known or standard intensity. By means of switch 11, waves from source 12 may be interrupted at will.

In determining wave amplitudes by means of this arrangement waves from local source 5 are impressed upon tube 1, and these amplitudes indicated by indicator 8. Source 5 is then disconnected by means of switch 6 and waves from source 14 are impressed upon the input of tube 1. These waves are varied in intensity by means of potentiometer 15 until the reading of indicator 8 is the same as that obtained when waves were being impressed from source 5.

When the above condition is attained, waves from sources 5 and 14 are maintained constant and signal or incoming waves from the antenna 2 are impressed upon the receiving circuit in the usual manner. These waves combine with the oscillations from source 5 to produce intermediate frequency waves capable of being amplified by intermediate frequency amplifier 9. These waves are rectified and actuate indicator 10. The antenna 2 is then disconnected by switch 4 and waves from source 12 and source 14 are applied to the input circuit of the receiver. These waves produce the same intermediate frequency as before. The amplitude of the intermediate frequency is determined by the reading of indicator 10. The amplitude of waves from source 12 is adjusted by potentiometer 13 until the reading of indicator 10 is the same as was obtained when signals were being received from antenna 2.

The strength of the field in which the antenna is located may be computed provided the constants of the antenna are known, taking into consideration the fact that the amplitude of a wave produced by two beating waves combined in a "square law" detector is proportional to the product of the amplitudes of the two separate waves. In this case, the two beat waves as indicated at ammeter 10 are equal and the individual waves from sources 14 and 15 as indicated at ammeter 8 are equal. From this it follows that the signal wave received from antenna 2 is equal to that impressed from local source 12. The strength of the signal wave received being determined, the absolute value of field strength may be computed. Sources 12 and 14 are operating at comparatively low frequencies and may be calibrated by potentiometers 15 and 13 and readily controlled. The contact element of potentiometer 13, if desired, may actuate an indicator moving over a scale which may be calibrated to read directly the strength of the field by taking into consideration the amplitude of the wave from source 12 transmitted therethrough and the constants of antenna 2.

By way of illustration only, the following frequency values may be assumed. In case the incoming signal wave, the amplitude of which it is desired to measure, should have a frequency of the order of 4,000,000 cycles, oscillator 5 would operate at a frequency of 3,970,000 cycles. Oscillator 12 would operate at a frequency of 100,000 cycles and oscillator 14 at 70,000 cycles.

Should it be desired to compare waves from source 12 directly with signal waves received from the antenna 2 it would be found extremely difficult to control and calibrate the local source operating at a frequency of 4,000,000 cycles. Comparing the received signal wave at a frequency of 4,000,000 cycles directly with local waves at a frequency of 100,000 cycles, would necessitate retuning the circuit which would in itself, change the amplitude of the signals to such a degree that the data obtained would be valueless.

Although this invention has been shown and described as applied to a specific system in a particular manner it is not to be limited thereto but only in accordance with the scope of the invention as defined by the following claims.

What is claimed is:

1. A method of measuring field strength of a high frequency signal wave which comprises comparing the beat frequency wave of said signal wave and a locally generated wave with a beat frequency wave of the same frequency produced by waves from two locally generated waves of substantially lower frequency.

2. A method of field strength measurement with a double detection receiver including a local oscillator which comprises comparing a received signal wave with a local wave produced by beating waves from two local oscillators adapted to produce waves of the same beat frequency as that produced by the received signal wave and the wave from the first mentioned oscillator.

3. In a radio signaling system, means for receiving and detecting a wave, means for combining said wave with oscillations from a local source to produce an oscillation of a given intermediate frequency, means for detecting and measuring the amplitude of the wave at said intermediate frequency, means for producing a wave having the same intermediate frequency for comparison purposes, comprising two additional local sources, devices for impressing waves therefrom upon said means for combining, and means for comparing the amplitude of said intermediate frequency waves, and means for comparing the amplitude of waves from said local source with waves from one of said two additional local sources.

4. In a radio signaling system, means for receiving a radiated wave, means for combining said received wave with waves from a local oscillator to produce a wave of a given beat frequency, and means for measuring waves of said beat frequency in combination with means for introducing to said receiving system waves from local sources having the same beat frequency, said sources operating at frequencies substantially lower than that of the first mentioned waves.

5. In a radio signaling system, a local source of oscillations, means for determining the amplitude of said oscillations, means for combining said oscillations with a received wave to produce a beat frequency wave, and means for determining the amplitude of said beat frequency wave whereby the amplitude of the received wave may be ascertained.

6. In a radio receiving system, a source of local oscillations, means for combining said oscillations with a received wave whereby a wave of beat frequency is produced, a second source of local oscillations, means for comparing the amplitude of the waves from said local sources, a third source of local oscillations, means for combining waves from said second and third sources whereby a wave of beat frequency is produced, and means for comparing said waves of beat frequency whereby the amplitude of the received wave may be computed.

7. In a radio receiving system, a source of local oscillations, means for combining said oscillations with a received wave whereby a beat frequency wave is produced, a second source of local oscillations of comparatively low frequency, means for comparing and controlling the waves from said sources, a third source of local oscillations of comparatively low frequency but differing from that of said second source by said beat frequency, means for combining said low frequency waves to produce a wave of said beat frequency, and means for comparing said waves of beat frequency whereby the amplitude of the received wave may be ascertained.

8. A method of measuring field strength which comprises generating a local wave, combining said wave with the wave to be measured to produce a wave of beat frequency, generating a local wave of low frequency, comparing said local waves, generating a second local low frequency wave differing in frequency from said first wave by said beat frequency, combining said low frequency waves to produce a second wave of beat frequency, and comparing said beat frequency waves.

9. The method of determining the amplitude or intensity of a periodic energy "X" of unknown amplitude by means of periodic energies $a$, $b$ and $c$ which comprises employing energies $a$ and $b$ to produce an energy $d$ of a given frequency and any desired amplitude, establishing energy $c$ in known intensity relation to energy $a$, then employing energies $c$ and "X" to produce an energy $d'$ of intensity equal to or in known relation to energy $d$ and determining the value of "X" by measuring the intensity of energy $c$ necessary to cooperate with energy "X" to produce $d'$.

10. The method of claim 9, in which energies $c$ and X are in the same general range of frequencies and $a$ and $b$ are in a widely different range.

11. The method of claim 9, in which energies $c$ and X are electric waves of relatively high frequency, $a$ and $b$ are electric waves of relatively low frequency and the amplitudes of $d$ and $d'$ are proportional to the products of the amplitudes of the waves which produce them.

In witness whereof, I hereunto subscribe my name this 3rd day of June A. D., 1925.

HARALD T. FRIIS.